United States Patent
Karaki et al.

(10) Patent No.: US 12,201,927 B2
(45) Date of Patent: Jan. 21, 2025

(54) DISTILLATION TOWER MANAGEMENT SYSTEM, DISTILLATION TOWER STATE ANALYSIS METHOD AND DISTILLATION TOWER MANAGEMENT METHOD

(71) Applicant: KURITA WATER INDUSTRIES LTD., Tokyo (JP)

(72) Inventors: Keisuke Karaki, Saitama (JP); Kenta Emori, Saitama (JP); Hiroaki Minami, Saitama (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 199 days.

(21) Appl. No.: 17/642,952

(22) PCT Filed: Sep. 11, 2020

(86) PCT No.: PCT/JP2020/034406
§ 371 (c)(1),
(2) Date: Mar. 15, 2022

(87) PCT Pub. No.: WO2021/117308
PCT Pub. Date: Jun. 17, 2021

(65) Prior Publication Data
US 2022/0331710 A1    Oct. 20, 2022

(30) Foreign Application Priority Data

Dec. 13, 2019    (JP) .................. 2019-225908

(51) Int. Cl.
*B01D 3/34*    (2006.01)
*B01D 3/42*    (2006.01)
*C10G 7/12*    (2006.01)

(52) U.S. Cl.
CPC .............. *B01D 3/4211* (2013.01); *B01D 3/34* (2013.01); *C10G 7/12* (2013.01)

(58) Field of Classification Search
CPC ............ B01D 3/34; B01D 3/4211; C10G 7/12
See application file for complete search history.

(56) References Cited

U.S. PATENT DOCUMENTS 3,436,337 A * 4/1969 Boyd .................. C10G 35/24
585/265
5,387,733 A * 2/1995 Weaver .................. C10G 7/10
208/47

(Continued)

FOREIGN PATENT DOCUMENTS

| CN | 102203219 | 9/2011 |
| JP | H1143677 | 2/1999 |

(Continued)

OTHER PUBLICATIONS

Shirakawa Yoshiyuki, "Development of soft sensor technology for facility management and diagnosis of petroleum refining plant," Feature Article I Optimized construction of facility maintenance/management system and newest technology for facility diagnosis, vol. 46, No. 11, with English translation thereof, Nov. 2001, pp. 1-18.

(Continued)

*Primary Examiner* — Jonathan Miller
(74) *Attorney, Agent, or Firm* — JCIPRNET

(57) ABSTRACT

Provide is a distillation tower management system, a distillation tower state analysis method, and a distillation tower management method that are capable of predicting abnormality in distillation towers before the abnormality becomes apparent and capable of taking preventive actions. The distillation tower management system includes a measurement unit 10 that is at least one selected from the group consisting of a pressure measurement unit 11, a temperature measurement unit 12 and a chlorine measurement unit 13, an operation data unit 20 for producing operation data containing measurement data measured with the measurement unit (Continued)

10, an analysis unit 30 for analyzing the state of a distillation tower 103 from the operation data and producing analysis data regarding the state of the distillation tower 103, and a control unit 40 for producing, based on the analysis data, control data regarding a differential pressure-eliminating agent that is added to the distillation tower 103.

4 Claims, 5 Drawing Sheets

(56) References Cited

U.S. PATENT DOCUMENTS

| | | | | |
|---|---|---|---|---|
| 5,656,152 | A * | 8/1997 | McLaughlin | C10G 31/08 208/DIG. 1 |
| 6,413,378 | B1 * | 7/2002 | Kanauchi | B01D 3/40 196/100 |
| 7,585,403 | B2 * | 9/2009 | Buccolini | C10G 75/02 208/47 |
| 8,608,912 | B2 * | 12/2013 | Noe | B01D 3/40 203/1 |
| 9,493,715 | B2 * | 11/2016 | Subbiah | C10G 7/10 |
| 2006/0060498 | A1 * | 3/2006 | Buccolini | C10G 75/04 208/48 AA |
| 2007/0256920 | A1 * | 11/2007 | Kanauchi | B01D 3/4255 203/2 |
| 2018/0105757 | A1 * | 4/2018 | Wang | G05B 23/0221 |
| 2018/0355258 | A1 * | 12/2018 | Cross | C10G 31/08 |
| 2020/0087229 | A1 * | 3/2020 | Piszczek | C07C 7/04 |

FOREIGN PATENT DOCUMENTS

| | | |
|---|---|---|
| JP | 2000096067 | 4/2000 |
| JP | 2000176202 | 6/2000 |
| JP | 2005224695 | 8/2005 |
| JP | 2019090024 | 6/2019 |
| WO | 2006025330 | 3/2006 |
| WO | 2006032620 | 3/2006 |

OTHER PUBLICATIONS

"International Search Report (Form PCT/ISA/210) of PCT/JP2020/034406," mailed on Nov. 24, 2020, with English translation thereof, pp. 1-6.

Michel Melin et al., "Salt Deposition in FCC Gas Concentration Units," Grace Davison Catalagram, Issue No. 107, 2010, pp. 34-40.

"Office Action of Taiwan Counterpart Application", issued on Feb. 20, 2024, with English translation thereof, pp. 1-25.

* cited by examiner

DISTILLATION TOWER MANAGEMENT SYSTEM, DISTILLATION TOWER STATE ANALYSIS METHOD AND DISTILLATION TOWER MANAGEMENT METHOD

CROSS-REFERENCE TO RELATED APPLICATION

This application is a 371 application of the International PCT application serial no. PCT/JP2020/034406, filed on Sep. 11, 2020, which claims the priority benefit of Japan Patent Application No. 2019-225908, filed on Dec. 13, 2019. The entirety of each of the above-mentioned patent applications is hereby incorporated by reference herein and made a part of this specification.

TECHNICAL FIELD

The present invention relates to a distillation tower management system, a distillation tower state analysis method, and a distillation tower management method.

BACKGROUND ART

In distillation towers in distillation facilities for petroleum refinery processes, petroleum chemical processes, coal chemical processes and the like, a problem has been that the flow of the processes is hindered by the precipitation of a neutral salt represented by ammonium chloride, which leads to a decrease in the facility use efficiency. In addition, another problem is that the precipitated salt absorbs moisture, which results in the occurrence of severe local corrosion in the facilities. Clogging in distillation towers caused by a salt or the like is confirmed by an increase in the difference in pressure (hereinafter, referred to as the "differential pressure") in a predetermined position or the like.

As a method for eliminating the differential pressure caused by the precipitation of a salt (salting-out), a sublimation operation method or a method of applying cleaning water into towers is usually employed.

The sublimation operation method refers to an operation method in which a precipitated salt is sublimed by increasing the temperature of a distillation tower and discharged into a distillation tower-top system. Sublimation operation makes it possible to remove the precipitated salt from the tower top portion to the outside of the system.

The cleaning water application method is a method in which cleaning water is fed to a top reflux line, a top pump around and the like in a distillation tower, thereby feeding the cleaning water to a portion where a salt is precipitated and dissolving and removing the salt. The feed of cleaning water makes it possible to eliminate the differential pressure within a short period of time.

For example, NPL 1 describes a sublimation operation method in which a precipitated salt is sublimed by increasing the temperature of a distillation tower within a short period of time and discharged into a distillation tower-top system.

In addition, for example, PTL 1 describes a hydrocarbon oil distillation method in which, in a distillation treatment of hydrocarbon oil, water is introduced into a distillation tower, thereby removing water-soluble salts in the tower.

CITATION LIST

Patent Literature

PTL 1: U.S. Pat. No. 5,656,152 B

Non Patent Literature

NPL 1: GRACE DAVISON CATALAGRAM, ISSUE, 2010, No. 107, pp. 34 to 39

SUMMARY OF INVENTION

Technical Problem

Conventionally, methods for eliminating a differential pressure caused by salting-out such as the sublimation operation method and the cleaning water application method are carried out in a case where an increase in the differential pressure in a distillation tower is observed and the degree of such an increase is determined to be in a problematic situation. That is, since an increase in the differential pressure is not responded until abnormality in the distillation tower becomes apparent, a problem has been that the response becomes a late action and worsening of the situation such as a decrease in the amount treated or the progress of facility corrosion is allowed. In some cases, it takes several days to several months to confirm that an increase in differential pressure is obvious, and corrosion or contamination by a corrosion product that has progressed during the confirmation of the increase in differential pressure cannot be properly responded by the sublimation operation. In addition, since the corrosion product itself is highly corrosive, there is a concern that facilities may be additionally corroded during water cleaning.

In addition, while the use of a salt remover, a dispersant or the like makes it possible to reduce a risk of differential pressure or corrosion caused by a precipitated salt, in a case where corrosion has already progressed due to a precipitated salt, there is no solution.

The present invention has been made in consideration of such circumstances, and an objective of the present invention is to provide a distillation tower management system, a distillation tower state analysis method, and a distillation tower management method that are capable of predicting abnormality in distillation towers before the abnormality becomes apparent (in other words, detecting the warning of abnormality in distillation towers) and capable of taking preventive actions.

Solution to Problem

In order to solve the above-described problems, the present inventors have conducted intensive studies and consequently found that the warning of abnormality can be detected by acquiring the operation information of a distillation tower and analyzing a change in the operation information.

The present invention has been completed based on such a finding.

That is, the present disclosure relates to the followings.

(1) A distillation tower management system including a measurement unit that is at least one selected from the group consisting of a pressure measurement unit that measures pressures at a plurality of different sites in a height direction of a distillation tower, a temperature measurement unit that measures a tower top portion temperature of the distillation tower, and a chlorine measurement unit that measures a feed rate of chlorine fed to the distillation tower and a discharge rate of chlorine discharged from the distillation tower, an operation data unit that produces operation data containing measurement data measured with the measurement unit, an analysis unit that analyzes a state of the distillation tower from the operation data and produces analysis data regarding the state of the distillation tower, and a control unit that produces, based on the analysis data, control data regarding a differential pressure-eliminating agent that is added to the distillation tower, in which, in a case where the measurement unit is the pressure measurement unit, the operation data unit produces operation data containing differential pressure data regarding a differential pressure between pressures at a plurality of sites measured with the pressure measurement unit, in a case where the measurement unit is the temperature measurement unit, the operation data unit produces operation data containing temperature difference data regarding a temperature difference between the tower top portion temperature measured with the temperature measurement unit and a salting-out temperature obtained by calculation, and, in a case where the measurement unit is the chlorine measurement unit, the operation data unit produces operation data containing chlorine rate difference data regarding a difference in chlorine rate between the chlorine feed rate and the chlorine discharge rate measured with the chlorine measurement unit.

(2) The distillation tower management system according to (1), in which the analysis unit analyzes predicted alteration of a future differential pressure from differential pressure alteration that is obtained from the differential pressure data.

(3) The distillation tower management system according to (1) or (2), in which the differential pressure-eliminating agent is at least one of a salt remover and a salt dispersant.

(4) A distillation tower state analysis method including a measurement step that is at least one selected from the group consisting of a pressure measurement step of measuring pressures at a plurality of different sites in a height direction of a distillation tower with a pressure measurement unit, a temperature measurement step of measuring a tower top portion temperature of the distillation tower with a temperature measurement unit, and a chlorine measurement step of measuring a feed rate of chlorine fed to the distillation tower and a discharge rate of chlorine discharged from the distillation tower with a chlorine measurement unit, an operation data production step of producing, with an operation data unit, operation data containing measurement data measured by the measurement step, and an analysis data production step of analyzing a state of the distillation tower from the operation data and producing analysis data regarding the state of the distillation tower with an analysis unit, in which, in a case where the measurement step is the pressure measurement step, the operation data production step includes a differential pressure data production step of producing operation data containing differential pressure data regarding a differential pressure between pressures at a plurality of sites measured with the pressure measurement unit, in a case where the measurement step is the temperature measurement step, the operation data production step includes a temperature difference data production step of producing operation data containing temperature difference data regarding a temperature difference between the tower top portion temperature and a salting-out temperature obtained by calculation, and, in a case where the measurement step is the chlorine measurement step, the operation data production step includes a chlorine rate difference data production step of producing operation data containing chlorine rate difference data regarding a difference in chlorine rate between the chlorine feed rate and the chlorine discharge rate.

(5) The distillation tower state analysis method according to (4), in which, in the analysis data production step, predicted alteration of a future differential pressure is analyzed with the analysis unit from differential pressure alteration that is obtained from the differential pressure data.

(6) A distillation tower management method including a measurement step that is at least one selected from the group consisting of a pressure measurement step of measuring pressures at a plurality of different sites in a height direction of a distillation tower with a pressure measurement unit, a temperature measurement step of measuring a tower top portion temperature of the distillation tower with a temperature measurement unit, and a chlorine measurement step of measuring a feed rate of chlorine fed to the distillation tower and a discharge rate of chlorine discharged from the distillation tower with a chlorine measurement unit, an operation data production step of producing, with an operation data unit, operation data containing measurement data measured by the measurement step an analysis data production step of analyzing a state of the distillation tower from the operation data and producing analysis data regarding the state of the distillation tower with an analysis unit, and a control data production step of producing, with a control unit based on the analysis data, control data regarding a differential pressure-eliminating agent that is added to the distillation tower, in which, in a case where the measurement step is the pressure measurement step, the operation data production step includes a differential pressure data production step of producing operation data containing differential pressure data regarding a differential pressure between pressures at a plurality of sites measured with the pressure measurement unit, in a case where the measurement step is the temperature measurement step, the operation data production step includes a temperature difference data production step of producing operation data containing temperature difference data regarding a temperature difference between the tower top portion temperature and a salting-out temperature obtained by calculation, and, in a case where the measurement step is the chlorine measurement step, the operation data production step includes a chlorine rate difference data production step of producing operation data containing chlorine rate difference data regarding a difference in chlorine rate between the chlorine feed rate and the chlorine discharge rate.

(7) The distillation tower management method according to (6), in which, in the analysis data production step, predicted alteration of a future differential pressure is analyzed with the analysis unit from differential pressure alteration that is obtained from the differential pressure data.

Advantageous Effects of Invention

According to the present invention, it is possible to provide a distillation tower management system, a distillation tower state analysis method, and a distillation tower management method that are capable of predicting abnormality in distillation towers before the abnormality becomes apparent and capable of taking preventive actions.

DESCRIPTION OF EMBODIMENT

Figure 1:
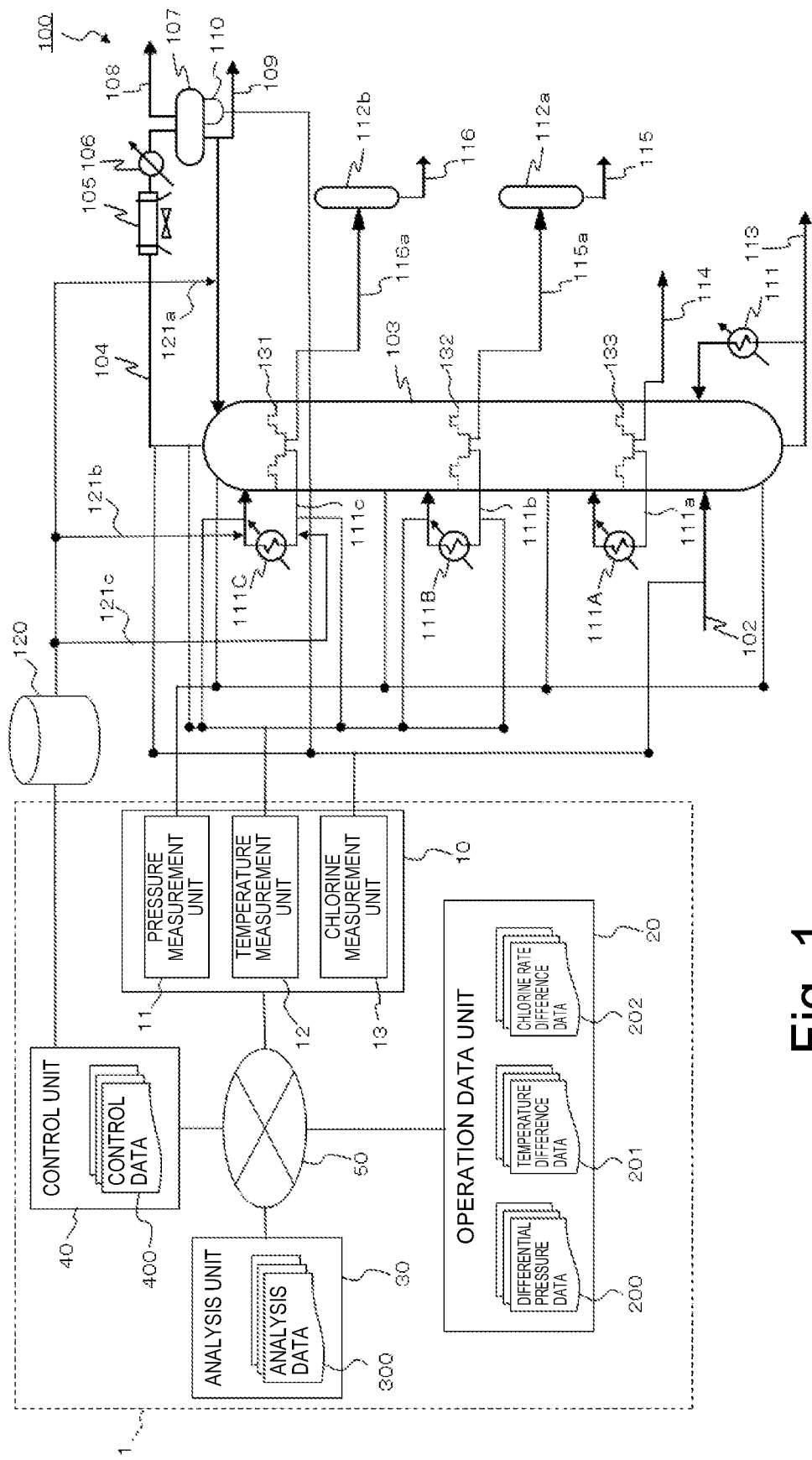
FIG. 1 is a block diagram of a distillation tower management system and a distillation tower facility according to an embodiment of the present invention.

Hereinafter, a distillation tower management system, a distillation tower state analysis method and a distillation tower management method according to an embodiment of the present invention (hereinafter, simply referred to as "the present embodiment" in some cases) will be specifically described.
[Distillation Tower Management System]
A distillation tower management system 1 according to the present embodiment includes a measurement unit 10, an operation data unit 20, an analysis unit 30 and a control unit 40 as shown in FIG. 1.

The configuration elements of the distillation tower management system 1 are connected to each other through a communication network 50, and data is exchanged through the communication network 50. The communication network 50 is, for example, a wired or wireless local area network (LAN), wide area network (WAN), internet, intranet, exclusive line or the like. The configuration elements of the distillation tower management system 1 are connected to the communication network 50, whereby, with the Internet of Things (IoT), it is possible to carry out remote control, remote monitoring, data transmission and the like, and it is enabled to mutually control the configuration elements.
<Distillation Facility>
As shown in FIG. 1, the distillation tower management system 1 is a system for managing a distillation tower facility (atmospheric distillation device) 100 and, particularly, a system for managing the operation state of a distillation tower 103. Therefore, first, the distillation tower facility 100 that is managed by the distillation tower management system 1 will be described.

Regarding the distillation tower facility 100, an atmospheric distillation method by an example of a single tower type will be described, but the present invention is not limited thereto, and the method may be an atmospheric distillation method by a different example of the single tower type or an atmospheric distillation method by a twin tower type. In addition, the distillation tower facility 100 may have side stripers as shown in FIG. 1 or may have no side stripers. Furthermore, the distillation tower facility 100 is not particularly limited in terms of the use and can be used in facilities for petroleum refinery processes, petroleum chemical processes or coal chemical processes. In addition, in the above-described example, the tray-type distillation tower facility 100 has been described, but the present invention is not limited thereto and may be a distillation tower facility in which infill is used.

In the distillation tower 103, a plurality of side fluxes is provided, and, for example, a first side reflux 131, a second side reflux 132 and a third side reflux 133 are sequentially provided from the top as shown in FIG. 1.

A line 111c and a line 116a are provided on the lower portion side of the first side reflux 131. The line 111c is connected to a heat exchanger 111C, and some of a fraction fractionally distilled with the first side reflux 131 is refluxed toward the upper portion in the tower. The line 116a is connected to a side stripper 112b, and some of the fraction fractionally distilled with the first side reflux 131 is sent to the side stripper 112b through the line 116a.

A line 111b and a line 115a are provided on the lower portion side of the second side reflux 132. The line 111b is connected to a heat exchanger 111B, and some of a fraction fractionally distilled with the second side reflux 132 is refluxed toward the upper portion in the tower. The line 115a is connected to a side stripper 112a, and some of the fraction fractionally distilled with the second side reflux 132 is sent to the side stripper 112a through the line 115a.

A line 111a and a line 114 are provided on the lower portion side of the third side reflux 133. The line 111a is connected to a heat exchanger 111A, and some of a fraction fractionally distilled with the third side reflux 133 is refluxed toward the upper portion in the tower. The line 114 is connected to the outside of the distillation tower 103, and some of the fraction fractionally distilled with the third side reflux 133 is sent to the outside of the distillation tower 103.

In the distillation tower facility 100, a raw material oil is fed to the distillation tower 103 from a line 102 and fractionally distilled into a heavy oil fraction, a heavy gas oil fraction, a light oil fraction, a heavy naphtha fraction, a naphtha fraction, a gas fraction and the like. In the case of being in an unheated state, the raw material oil is heated up to a temperature of approximately 350° C. with a heating furnace (not shown) or a heat exchanger and then continuously fed to the distillation tower 103.

The heavy oil fraction has a boiling point of approximately 350° C. or higher, fractionally distilled in the tower bottom portion and ejected from a line 113. Some of the heavy oil fraction ejected from the line 113 is heated with a heat exchanger 111 and then refluxed toward the lower portion side of the third side reflux 133 in the distillation tower 103.

The heavy gas oil fraction has a boiling point of approximately 240° C. to 350° C. and ejected from the line 114.

The light oil fraction has a boiling point of approximately 170° C. to 250° C. and ejected from the line 115 through the side stripper 112a.

The heavy naphtha or kerosene fraction has a boiling point of approximately 80° C. to 180° C. and ejected from the line 116 through the side stripper 112b.

The naphtha fraction and the gas fraction have a boiling point of approximately 35° C. to 80° C. and discharged from the tower top portion of the distillation tower 103. The naphtha fraction and the gas fraction discharged from the tower top portion of the distillation tower 103 pass through a line 104, are condensed with an air cooling-type cooler 105 and a heat exchanger 106 and collected in a naphtha receiver (an example of an overhead receiver) 107. In this naphtha receiver 107, gas and liquid are separated, a fuel gas, a liquefied petroleum gas or the like is ejected from a line 108 as a gas fraction, and the naphtha fraction as a liquid fraction is ejected from a line 109. In addition, water accumulating in the lowest portion of the naphtha receiver 107 (overhead receiver water) is drained from a water drainage unit 110 of the naphtha receiver 107.

In FIG. 1, the heat exchangers 111, 111A, 111B and 111C are used to cool some of the fractions fractionally distilled from the distillation tower and to reflux some of the fractions to the inside of the tower from the viewpoint of temperature management.

<Measurement Unit>

The measurement unit 10 is at least one selected from the group consisting of a pressure measurement unit 11 for measuring pressures at a plurality of different sites in the height direction of the distillation tower 103, a temperature measurement unit 12 for measuring the tower top portion temperature of the distillation tower 103 and a chlorine measurement unit 13 for measuring the feed rate of chlorine fed to the distillation tower 103 and the discharge rate of chlorine discharged from the distillation tower 103. That is, measurement data that is measured with the measurement unit 10 is obtained from at least one selected from the group consisting of the pressure measurement unit 11, the temperature measurement unit 12 and the chlorine measurement unit 13. In other words, the measurement unit 10 is any one of the pressure measurement unit 11, the temperature measurement unit 12 and the chlorine measurement unit 13, any two of those units or those three units, and the measurement data is obtained from any one of the pressure measurement unit 11, the temperature measurement unit 12 and the chlorine measurement unit 13, any two of those units or those three units.

Hereinafter, the pressure measurement unit 11, the temperature measurement unit 12 and the chlorine measurement unit 13 will be described in detail.

<<Pressure Measurement Unit>>

The pressure measurement unit 11 measures pressures at a plurality of different sites in the height direction of the distillation tower 103 and acquires the pressure of each site in the distillation tower 103. The pressure measurement unit 11 measures pressures at arbitrary sites in the distillation tower 103 and is thereby capable of acquiring the pressures at the arbitrary sites in the distillation tower 103 and capable of acquiring, for example, the pressure at the tower top portion of the distillation tower 103 and the upper portion or lower portion pressure in at least any of the plurality of side refluxes such as the first side reflux 131, the second side reflux 132 and the third side reflux 133. The pressure measurement unit 11 may be a configuration that directly measures pressures in the distillation tower 103 or may be a configuration that acquires pressures correlating with pressures in the tower. The pressure measurement unit 11 may continuously acquire or intermittently acquire the pressures in the distillation tower 103.

As the pressure measurement unit 11, for example, a strain gauge-type pressure sensor or the like can be used.

In addition, the pressures that are acquired with the pressure measurement unit 11 may be estimated values.

<<Temperature Measurement Unit>>

The temperature measurement unit 12 is preferably provided near the tower top portion of the distillation tower 103 and measures the tower top portion temperature. The temperature measurement unit 12 may be a configuration that directly measures the temperature in the distillation tower 103 or may be a configuration that acquires a temperature correlating with the tower top portion temperature (for example, the temperature ahead of or behind the heat exchanger 111B or 111C). The temperature measurement unit 12 may continuously acquire or intermittently acquire the tower top portion temperature of the distillation tower 103.

As the temperature measurement unit 12, for example, a temperature sensor such as a thermocouple can be used.

In addition, the tower top portion temperature that is acquired with the temperature measurement unit 12 may be an estimated value.

<<Chlorine Measurement Unit>>

The chlorine measurement unit 13 is provided in the line 102 that feeds the raw material oil to the distillation tower 103 and measures the feed rate of chlorine fed to the distillation tower 103. In addition, the chlorine measurement unit 13 is provided in the line 104 that discharges the naphtha fraction and the gas fraction from the tower top portion of the distillation tower 103 and/or in the water drainage unit 110 that discharges drain water and measures the discharge rate of chlorine discharged from the distillation tower 103. The chlorine measurement unit 13 may continuously acquire or intermittently acquire the chlorine feed rate and the chlorine discharge rate.

Examples of the chlorine measurement unit 13 include any units that measure the chlorine feed rate and the chlorine discharge rate by a method in which the chlorine rate is measured from each of the raw material oil and the drain water, a method in which the chlorine feed rate and the chlorine discharge rate are measured by X-ray analysis or the like as long as the chlorine feed rate and the chlorine discharge rate can be measured.

<Operation Data Unit>

The operation data unit 20 produces operation data containing the measurement data measured with the measurement unit 10.

In a case where the measurement unit 10 is the pressure measurement unit 11, the operation data unit 20 produces operation data containing differential pressure data 200 regarding a differential pressure between portions in the distillation tower 103.

The differential pressure data 200 is obtained by calculating a difference between individual pressures at portions in the distillation tower 103, which are measured with the pressure measurement unit 11. For example, the differential pressure data 200 in the first side reflux 131 can be obtained by acquiring the pressure at the tower top portion of the distillation tower 103 and the lower portion pressure at the first side reflux 131 and obtaining the difference between these acquired pressures.

The differential pressure data 200 is preferably a corrected differential pressure that is a value corrected with the amount of process fluid passing through a site from which the differential pressure has been obtained.

Alteration in the differential pressure data 200 may be based on continuous data or intermittent data.

In a case where the measurement unit 10 is the temperature measurement unit 12, the operation data unit 20 produces operation data containing temperature difference data 201 regarding a temperature difference between the tower top portion temperature measured with the temperature measurement unit 12 and the salting-out temperature obtained by calculation.

The temperature difference data 201 can be obtained by calculating the difference between the tower top portion temperature and the salting-out temperature.

The salting-out temperature can be obtained by calculation using the Antoine equation. For example, the salting-out temperature may be calculated based on Calculations estimate process stream depositions (Oil & Gas Journal Jan. 3, 1994, pp. 38 to 41).

In a case where the measurement unit 10 is the chlorine measurement unit 13, the operation data unit 20 produces operation data containing chlorine rate difference data 202 regarding the difference in chlorine rate between the chlorine feed rate and the chlorine discharge rate measured with the chlorine measurement unit 13.

The chlorine rate difference data 202 can be obtained by calculating the difference between the feed rate of chlorine fed to the distillation tower 103 and the discharge rate of chlorine discharged from the distillation tower 103.

<Analysis Unit>

The analysis unit 30 analyzes the state of the distillation tower 103 from the operation data and produces analysis data 300 regarding the state of the distillation tower 103. The analysis unit 30 analyzes, for example, the presence or absence of salting-out as the state of the distillation tower 103.

Figure 2:
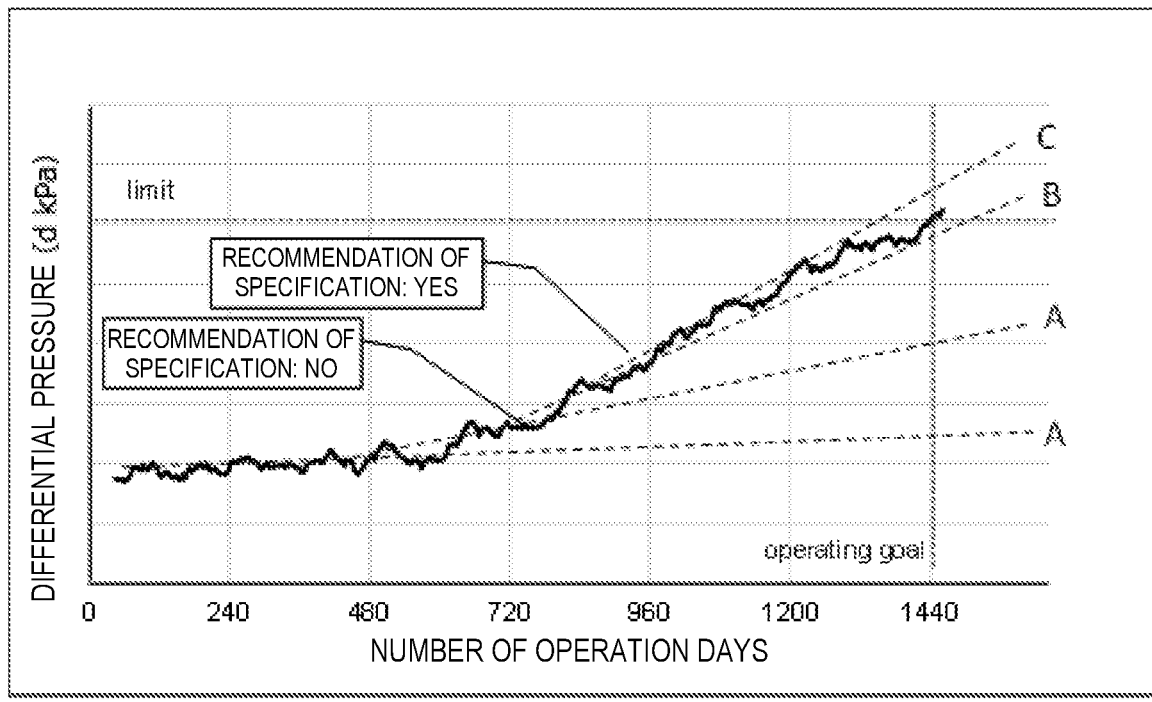
FIG. 2 is an example of analysis data produced by analyzing operation data containing differential pressure data in the distillation tower management system according to the embodiment of the present invention.

The analysis unit 30 is capable of analyzing the predicted alteration of a future differential pressure from the differential pressure alteration that is obtained from the differential pressure data 200. The differential pressure alteration that is obtained from the differential pressure data 200 may be grasped from the value of a change in the differential pressure per unit time or may be grasped by graphing the differential pressure alteration that is obtained from the differential pressure data 200. An example of the analysis data 300 produced with the analysis unit 30 by analyzing the operation data containing the differential pressure data 200 is shown in FIG. 2. FIG. 2 is a graph showing the number of operation days along the horizontal axis and differential pressures along the vertical axis. That is, FIG. 2 is a graph showing the differential pressure alteration. The analysis unit 30 carries out at least one of a group consisting of moving average, exponential mean, linear approximation, non-linear approximation, multivariate analysis and the other free set values based on the differential pressure alteration that has been thus far obtained, thereby analyzing the predicted alteration of a future differential pressure from the differential pressure alteration that has been thus far obtained. Specifically, the analysis unit 30 analyzes the predicted alteration of the future differential pressure from the slope of a graph showing the differential pressure alteration that is obtained from the differential pressure data 200. In addition, the analysis unit 30 predicts whether or not the predicted alteration obtained by the analysis reaches an upper limit differential pressure set as a state in which the operation of the distillation tower 103 is hindered.

As a result of analyzing the predicted alteration of the future differential pressure from the differential pressure alteration, for example, in a case where a period of time during which the predicted differential pressure is predicted to reach the upper limit differential pressure exceeds an intended period of time of operation, the differential pressure is evaluated as "A", which means that the differential pressure is favorable. In the case of "A evaluation", a change in the operation specification (the kind of a differential pressure-eliminating agent, the amount of the differential pressure-eliminating agent added and the like) of the distillation tower 103 is not recommended. On the other hand, as a result of analyzing the predicted alteration of the future differential pressure from the differential pressure alteration, for example, in a case where there is a concern that the period of time during which the predicted differential pressure is predicted to reach the upper limit differential pressure may become shorter than the intended period of time, the differential pressure is evaluated as "B", which means that attention needs to be paid to the differential pressure, and, in a case where the period of time becomes shorter than the intended period of time, the differential pressure is evaluated as "C", which means that an action needs to be taken regarding the differential pressure. In the case of "B evaluation" or "C evaluation", a change in the operation specification of the distillation tower 103 is recommended.

The predicted alteration of the future differential pressure can be made more accurate using a result obtained by learning, such as machine learning or deep learning.

Figure 3:
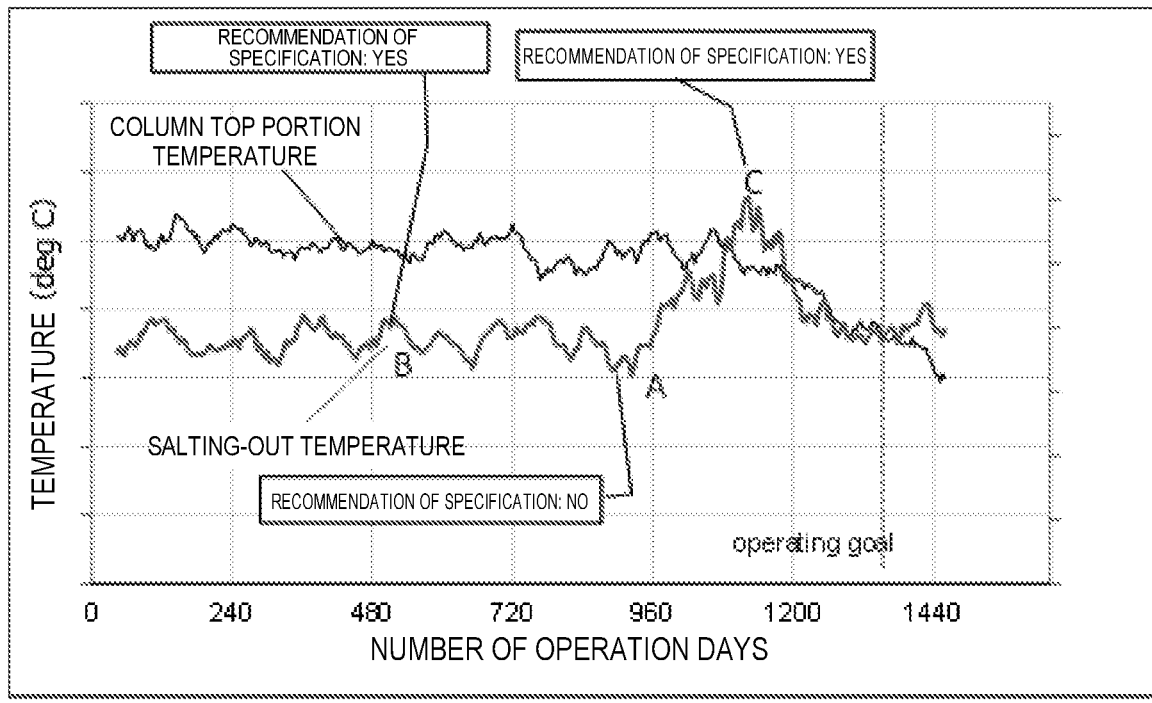
FIG. 3 is an example of analysis data produced by analyzing operation data containing temperature difference data in the distillation tower management system according to the embodiment of the present invention.

The analysis unit 30 is capable of analyzing the predicted alteration of a future temperature difference from the temperature difference alteration between the tower top portion temperature and the salting-out temperature that is obtained from the temperature difference data 201. The temperature difference alteration that is obtained from the temperature difference data 201 may be grasped from the value of a change in the temperature difference per unit time or may be grasped by graphing the temperature difference alteration that is obtained from the temperature difference data 201. An example of the analysis data 300 produced with the analysis unit 30 by analyzing the operation data containing the temperature difference data 201 is shown in FIG. 3. FIG. 3 is a graph showing the number of operation days along the horizontal axis and temperatures along the vertical axis. That is, FIG. 3 is a graph showing the temperature difference alteration between the tower top portion temperature and the salting-out temperature. The analysis unit 30 carries out at least one of a group consisting of moving average, exponential mean, linear approximation, non-linear approximation, multivariate analysis and the other free set values based on the temperature difference alteration that has been thus far obtained, thereby analyzing the predicted alteration of a future temperature difference from the temperature difference alteration that has been thus far obtained. Specifically, the analysis unit 30 analyzes the predicted alteration of the future temperature difference from the slopes of graphs showing the temperature difference alteration that is obtained from the temperature difference data 201. In addition, the analysis unit 30 sets a case where the tower top portion temperature is below the salting-out temperature as a state in which the operation of the distillation tower 103 is hindered and predicts whether or not the tower top portion temperature is below the salting-out temperature in the predicted alteration obtained by analysis.

As a result of analyzing the predicted alteration of the future temperature difference from the temperature difference alteration, for example, in a case where the tower top portion temperature is predicted to be greater than or equal to the salting-out temperature, the temperature difference is evaluated as "A", which means that the temperature difference is favorable. In the case of "A evaluation", a change in the operation specification (the kind of the differential pressure-eliminating agent, the amount of the differential pressure-eliminating agent added and the like) of the distillation tower 103 is not recommended. On the other hand, as a result of analyzing the predicted alteration of the future temperature difference from the temperature difference alteration, for example, in a case where it is predicted that there may be a concern that the tower top portion temperature may reach the salting-out temperature, the temperature difference is evaluated as "B", which means that attention needs to be paid to the temperature difference, and, in a case where it is predicted that the tower top portion temperature may be highly likely to reach the salting-out temperature, the temperature difference is evaluated as "C", which means that an action needs to be taken regarding the temperature difference. In the case of "B evaluation" or "C evaluation", a change in the operation specification of the distillation tower 103 is recommended.

The predicted alteration of the future temperature difference can be made more accurate using a result obtained by learning, such as machine learning or deep learning.

Figure 4:
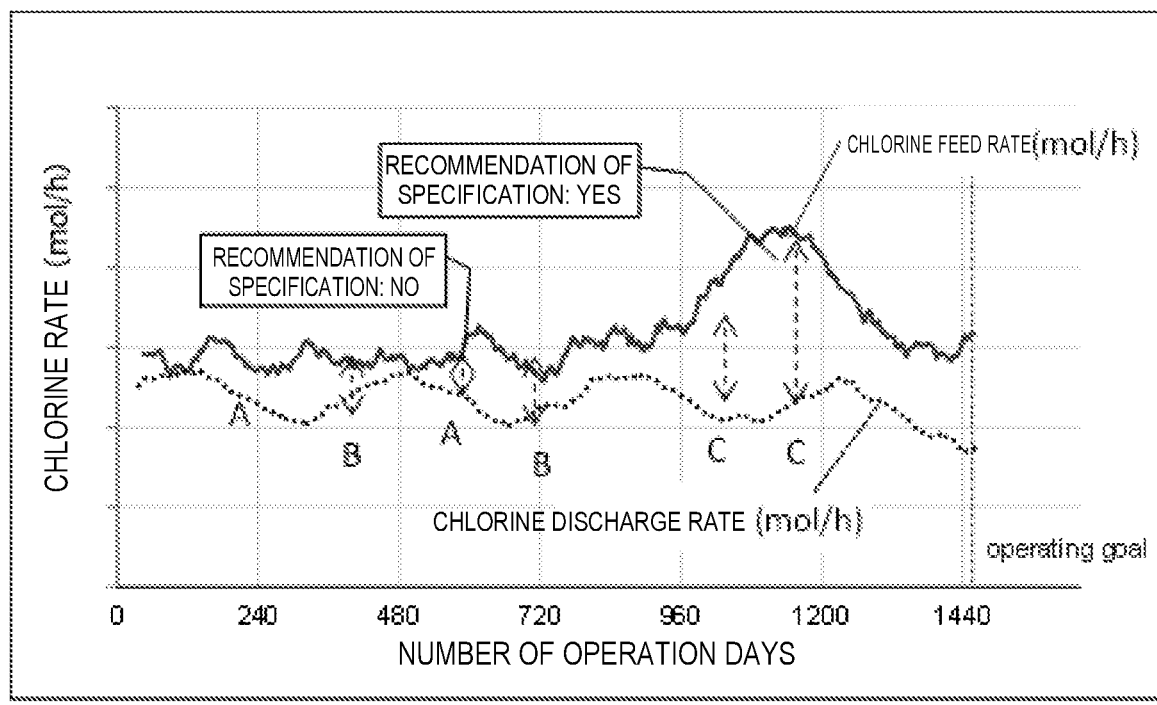
FIG. 4 is an example of analysis data produced by analyzing operation data containing chlorine rate difference data in the distillation tower management system according to the embodiment of the present invention.

The analysis unit 30 is capable of analyzing the predicted alteration of a future chlorine difference from the chlorine rate difference alteration between the chlorine feed rate and the chlorine discharge rate obtained from the chlorine rate difference data 202. The chlorine difference alteration that is obtained from the chlorine rate difference data 202 may be grasped from the value of a change in the chlorine difference per unit time or may be grasped by graphing the chlorine difference alteration that is obtained from the chlorine rate difference data 202. An example of the analysis data 300 produced with the analysis unit 30 by analyzing the operation data containing the chlorine rate difference data 202 is shown in FIG. 4. FIG. 4 is a graph showing the number of operation days along the horizontal axis and the amounts of chlorine along the vertical axis. That is, FIG. 4 is a graph showing the chlorine rate difference alteration between the chlorine feed rate and the chlorine discharge rate. The analysis unit 30 carries out at least one of a group consisting of moving average, exponential mean, linear approximation, non-linear approximation, multivariate analysis and the other free set values based on the chlorine rate difference alteration that has been thus far obtained, thereby analyzing the predicted alteration of a future chlorine rate difference from the chlorine rate difference alteration that has been thus far obtained. Specifically, the analysis unit 30 analyzes the predicted alteration of the future chlorine rate difference from the slopes of graphs showing the chlorine rate difference alteration that is obtained from the chlorine rate difference data 202. In addition, the analysis unit 30 sets a case where the chlorine rate difference between the chlorine feed rate and the chlorine discharge rate becomes a certain value or more as a state in which the operation of the distillation tower 103 is hindered and predicts whether or not the chlorine rate difference between the chlorine feed rate and the chlorine discharge rate becomes the certain value or more in the predicted alteration obtained by analysis.

As a result of analyzing the predicted alteration of the future chlorine rate difference from the chlorine difference alteration, for example, in a case where the chlorine rate difference between the chlorine feed rate and the chlorine discharge rate is predicted to be below the certain value, the chlorine rate difference is evaluated as "A", which means that the chlorine rate difference is favorable. In the case of "A evaluation", a change in the operation specification (the kind of the differential pressure-eliminating agent, the amount of the differential pressure-eliminating agent added and the like) of the distillation tower 103 is not recommended. On the other hand, as a result of analyzing the predicted alteration of the future chlorine rate difference from the chlorine difference alteration, for example, in a case where there is a concern that the chlorine rate difference between the chlorine feed rate and the chlorine discharge rate may reach the certain value, the chlorine rate difference is evaluated as "B", which means that attention needs to be paid to the chlorine rate difference, and, in a case where the chlorine rate difference between the chlorine feed rate and the chlorine discharge rate is highly likely to reach the certain value, the chlorine rate difference is evaluated as "C", which means that an action needs to be taken regarding the chlorine rate difference. In the case of "B evaluation" or "C evaluation", a change in the operation specification of the distillation tower 103 is recommended.

The predicted alteration of the future chlorine rate difference can be made more accurate using a result obtained by learning, such as machine learning or deep learning.

<Control Unit>

The control unit 40 produces, based on the analysis data 300, control data 400 regarding the differential pressure-eliminating agent that is added to the distillation tower 103. The control data 400 is data containing the kind of the differential pressure-eliminating agent that is added to the distillation tower 103 and the amount of the differential pressure-eliminating agent added.

In a case where the operation of the distillation tower 103 is predicted not to be hindered in the analysis data 300, the control unit 40 produces the control data 400 that maintains the kind of the differential pressure-eliminating agent that is added to the distillation tower 103 and the amount of the differential pressure-eliminating agent added. On the other hand, in a case where the operation of the distillation tower 103 is predicted to be hindered in the analysis data 300, the control unit 40 produces the control data 400 that changes the kind of the differential pressure-eliminating agent that is added to the distillation tower 103 and/or increases the amount of the differential pressure-eliminating agent added.

The control unit 40 sends the control data 400 to a differential pressure-eliminating agent tank 120 and adds the differential pressure-eliminating agent to the distillation tower 103 based on the control data 400.

The distillation tower management system 1 according to the present embodiment may be configured to include a differential pressure-eliminating agent-adding unit (not shown) that adds the differential pressure-eliminating agent to the distillation tower 103 based on the control data.

The differential pressure-eliminating agent is preferably at least one of a salt remover and a salt dispersant. The kind of a salt that becomes a target of the differential pressure-eliminating agent is not particularly limited, and examples of the salt include ammonium chloride, ammonium hydrosulfide, ammonium sulfate and the like.

The salt remover is a chemical agent that turns a precipitated salt into a neutral salt. The salt remover is preferably a quaternary ammonium compound. The quaternary ammonium compound is not particularly limited and may be one or more of hydroxymethyltrimethylammonium hydroxide, hydroxymethyltriethylammonium hydroxide, hydroxyethyltrimethylammonium hydroxide, (2-hydroxyethyl)triethylammonium hydroxide, (3-hydroxypropyl)trimethylammonium hydroxide and the like. Among them, (2-hydroxyethyl)triethylammonium hydroxide (hereinafter, referred to as "choline hydroxide") is preferable, and choline hydroxide may be used singly or choline hydroxide and an alkaline substance such as an organic amine may be used in combination.

The salt dispersant is a chemical agent that maintains a salt in a state of being suspended in a fluid and prevents deposition or adhesion. As the salt dispersant, for example, the salt dispersants described in International Publication WO. 2006/032620, U.S. Pat. Nos. 7,585,403 B and 5,387,733 B can be used.

A position where the differential pressure-eliminating agent is added (injected) to the distillation tower 103 is not particularly limited; however, from the viewpoint of discharging the precipitated salt to the outside of the distillation tower 103 within a short period of time, the differential pressure-eliminating agent is preferably added (injected) to a line of a top reflux of the atmospheric distillation device (the process fluid that is refluxed to the highest position of the tower with the tower-top system), an return line of a top pump around (a fraction corresponding to heavy naphtha or a gasoline fraction; the process fluid that is circulated and cooled) or an extraction line of the top pump around (a fraction corresponding to heavy naphtha or a gasoline fraction; the process fluid that is circulated and cooled) and more preferably added to the line of the top reflux. In addition, the differential pressure-eliminating agent may be added (injected) to a plurality of lines by combining several lines.

For example, in FIG. 1, the differential pressure-eliminating agent is preferably added (injected) to any line or a plurality of lines of the differential pressure-eliminating agent injection lines 121a, 121b and 121c.

The differential pressure-eliminating agent injection line 121a: fluid in the top reflux The differential pressure-eliminating agent injection line 121b: fluid in the return line of the top pump around The differential pressure-eliminating agent injection line 121c: fluid in the extraction line of the top pump around In the injection line, a quill nozzle is preferably used from the viewpoint of the dispersibility in the process fluid.

[Distillation Tower State Analysis Method]

Figure 5:
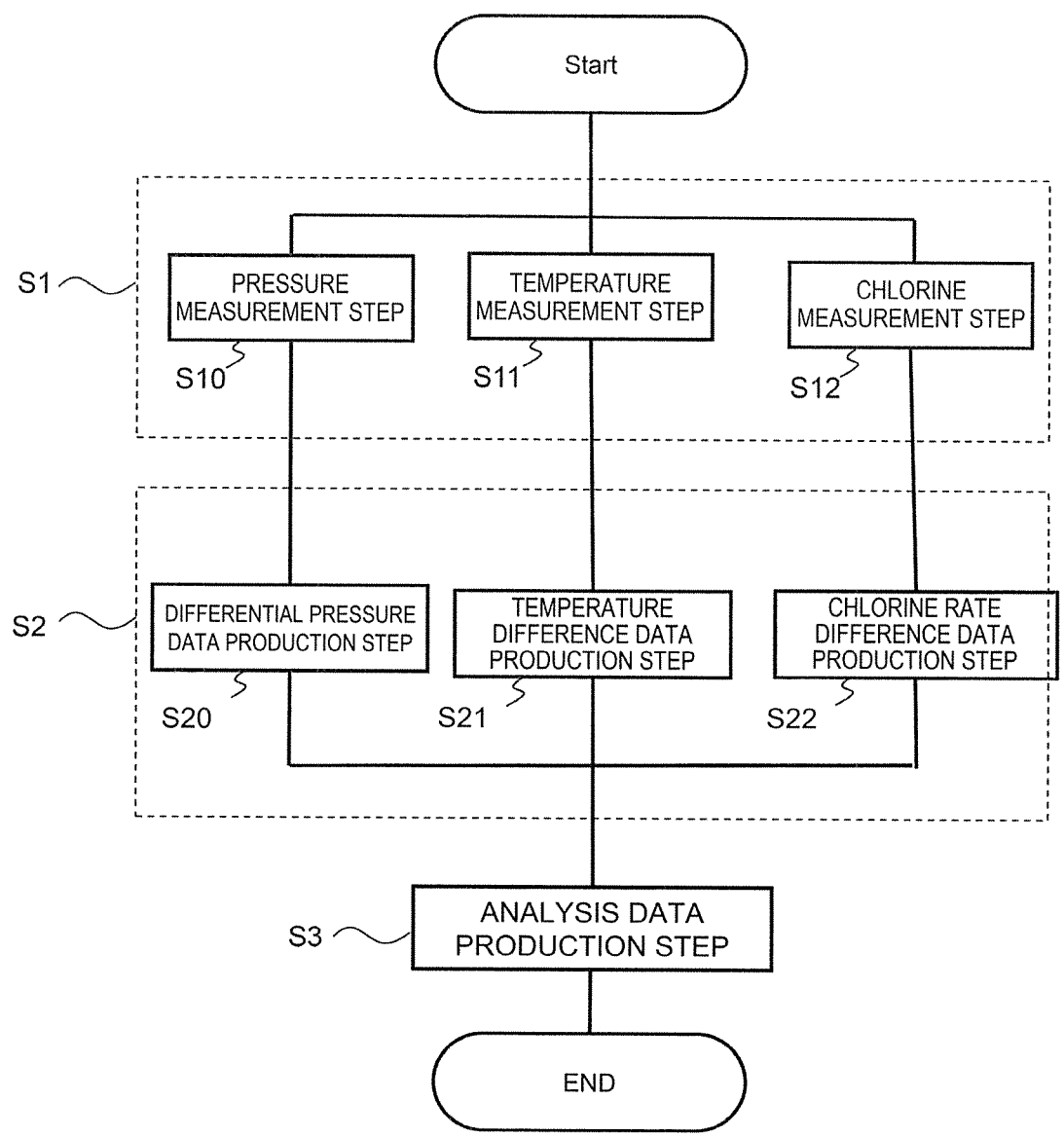
FIG. 5 is a flowchart showing a distillation tower state analysis method according to the embodiment of the present invention.

A distillation tower state analysis method according to the present embodiment includes a measurement step S1, an operation data production step S2 and an analysis data production step S3 as shown in FIG. 5. Hereinafter, the distillation tower state analysis method according to the present embodiment will be described with reference to FIG. 1 and FIG. 5.

<Measurement Step>

The measurement step S1 includes at least one selected from the group consisting of a pressure measurement step S10 of measuring pressures at a plurality of different sites in the height direction of the distillation tower 103 with the pressure measurement unit 11, a temperature measurement step S11 of measuring the tower top portion temperature of the distillation tower 103 with the temperature measurement unit 12 and a chlorine measurement step S12 of measuring the feed rate of chlorine fed to the distillation tower 103 and the discharge rate of chlorine discharged from the distillation tower 103 with the chlorine measurement unit 13.

<<Pressure Measurement Step>>

In a case where the measurement step S1 includes the pressure measurement step S10, specifically, the pressure at the tower top portion of the distillation tower 103 and the lower portion pressure in at least any of the plurality of side refluxes such as the first side reflux 131, the second side reflux 132 and the third side reflux 133 are measured with the pressure measurement unit 11. A method for measuring the pressures with the pressure measurement unit 11 may be a method in which pressures in the distillation tower 103 are directly measured or may be a method in which pressures correlating with the pressures in the tower are measured. Regarding the measurement of the pressures with the pressure measurement unit 11, the pressures in the distillation tower 103 may be continuously measured or intermittently measured.

The pressure measurement unit 11 stores the measured pressures in a storage unit (not shown) through the network 50. As the storage unit, for example, storage media such as a ROM, a RAM and a hard disc can be used. The pressure measurement unit 11 is connected to the communication network 50, whereby, with the Internal of Things (IoT), it is possible to carry out remote control, remote monitoring, data transmission and the like, and it is enabled to exchange information between the configuration elements of the distillation tower management system 1.

<<Temperature Measurement Step>>

In a case where the measurement step S1 includes the temperature measurement step S11, specifically, the tower top portion temperature of the distillation tower 103 is measured with the temperature measurement unit 12 provided in the tower top portion of the distillation tower 103. A method for measuring the temperature with the temperature measurement unit 12 may be a method in which temperature in the distillation tower 103 may be directly measured or may be a method in which a temperature correlating with the tower top portion temperature (for example, the temperature ahead of or behind the heat exchanger 111B or 111C) is measured. In addition, the tower top portion temperature that is acquired with the temperature measurement unit 12 may be an estimated value. Regarding the measurement of the temperature with the temperature measurement unit 12, the tower top portion temperature of the distillation tower 103 may be continuously measured or intermittently measured.

The temperature measurement unit 12 stores the measured temperature in the storage unit (not shown) through the network 50.

<<Chlorine Measurement Step>>

In a case where the measurement step S1 includes the chlorine measurement step S12, specifically, the feed rate of chlorine fed to the distillation tower 103 is measured with the chlorine measurement unit 13 provided in the line 102 that feeds the raw material oil to the distillation tower 103. In addition, the discharge rate of chlorine discharged from the distillation tower 103 is measured with the chlorine measurement unit 13 provided in the line 104 that discharges the naphtha fraction and the gas fraction from the tower top portion of the distillation tower 103 and/or in the water drainage unit 110 that discharges drain water. The chlorine feed rate and the chlorine discharge rate may be measured with the chlorine measurement unit 13 continuously or intermittently.

The chlorine measurement unit 13 store the measured chlorine feed rate and the measured chlorine discharge rate in the storage unit (not shown) through the network 50.

<Operation Data Production Step>

In the operation data production step S2, operation data containing the measurement data measured by the measurement step S1 is produced with the operation data unit 20.

<<Differential Pressure Data Production Step>>

In a case where the measurement step S1 includes the pressure measurement step S10, the operation data production step S2 includes a differential pressure data production step S20 of producing operation data containing the differential pressure data 200 regarding the differential pressure between portions in the distillation tower 103 with the operation data unit 20.

Specifically, first, the operation data unit 20 acquires data regarding the pressures measured by the measurement step S1 that are stored in the storage unit.

Next, the operation data unit 20 produces the differential pressure data 200 by calculating a difference between individual pressures at portions in the distillation tower 103, which have been measured by the measurement step S1. At this time, in the operation data unit 20, a corrected differential pressure obtained by correcting the differential pressure data 200 with the amount of process fluid passing through a differential pressure estimation site is preferably regarded as the differential pressure data 200. The operation data unit 20 may produce alteration in the differential pressure data 200 based on continuous data or intermittent data.

The operation data unit 20 stores the produced differential pressure data 200 in the storage unit (not shown) through the network 50.

<<Temperature Difference Data Production Step>>

In a case where the measurement step S1 includes the temperature measurement step S11, the operation data production step S2 includes a temperature difference data production step S21 of producing operation data containing the temperature difference data 201 regarding the temperature difference between the tower top portion temperature and the salting-out temperature obtained by calculation.

Specifically, the operation data unit 20 acquires data regarding the tower top portion temperature measured by the temperature measurement step S11 that is stored in the storage unit.

Next, the operation data unit 20 calculates the salting-out temperature based on the tower top portion pressure, the mole flow rate of an acid (for example, a chloride), the mole flow rate of bases (ammonia and amines), the amount of process fluid in terms of mole and the pressure value of the process. As the mole flow rate of the acid and the mole flow rate of the bases, fixed values may be used or the mole flow rates may be estimated from an analysis value of tower top drain water or a sensor-read value. In addition, as the amount of process fluid in terms of mole and the pressure value of the process, values read with an existing actual sensor can be used.

Next, the operation data unit 20 produces the temperature difference data 201 by calculating the difference between the tower top portion temperature and the salting-out temperature.

The operation data unit 20 stores the produced temperature difference data 201 in the storage unit (not shown) through the network 50.

<<Chlorine Rate Difference Data Production Step>>

In a case where the measurement step S1 includes the chlorine rate measurement step S12, the operation data production step S2 includes a chlorine rate difference data production step S22 of producing operation data containing the chlorine rate difference data 202 regarding the chlorine rate difference between the chlorine feed rate and the chlorine discharge rate.

Specifically, the operation data unit 20 acquires data regarding the chlorine feed rate and the chlorine discharge rate measured by the chlorine rate measurement step S12 that is stored in the storage unit.

Next, the operation data unit 20 produces the chlorine rate difference data 202 by calculating the difference between the feed rate of chlorine fed to the distillation tower 103 and the discharge rate of chlorine discharged from the distillation tower 103.

The operation data unit 20 stores the produced chlorine rate difference data 202 in the storage unit (not shown) through the network 50.

<Analysis Data Production Step>

In the analysis data production step S3, the state of the distillation tower 103 is analyzed from the operation data, and the analysis data 300 regarding the state of the distillation tower 103 is produced with the analysis unit 30. In the analysis data production step S3, as the state of the distillation tower 103, for example, the analysis data 300 is produced with the analysis unit 30 by analyzing the presence or absence of salting-out.

A case where the state of the distillation tower 103 is analyzed using the operation data containing the differential pressure data 200 in the analysis data production step S3 will be described.

First, the analysis unit 30 acquires operation data containing the differential pressure data 200 produced by the operation data production step S2 that is stored in the storage unit.

Next, the analysis unit 30 analyzes the predicted alteration of a future differential pressure from the differential pressure alteration that is obtained from the differential pressure data 200 based on the operation data containing the differential pressure data 200. The analysis unit 30 produces a graph showing the differential pressure alteration, like FIG. 2, based on, for example, the operation data containing the differential pressure data 200 and analyzes the predicted alteration of the future differential pressure from the graph showing the differential pressure alteration. Specifically, the analysis unit 30 analyzes the predicted alteration of the future differential pressure from the slope of the graph showing the differential pressure alteration that is obtained from the differential pressure data 200. In addition, the analysis unit 30 determines whether or not the predicted alteration obtained by the analysis reaches the upper limit differential pressure set as a state in which the operation of the distillation tower 103 is hindered and produces the analysis data 300 containing the determination result.

The analysis unit 30 stores the produced analysis data 300 in the storage unit (not shown) through the network 50.

A case where the state of the distillation tower 103 is analyzed using the operation data containing the temperature difference data 201 in the analysis data production step S3 will be described.

First, the analysis unit 30 acquires operation data containing the temperature difference data 201 produced by the operation data production step S2 that is stored in the storage unit.

Next, the analysis unit 30 analyzes the predicted alteration of a future temperature difference from the temperature difference alteration that is obtained from the temperature difference data 201 based on the operation data containing the temperature difference data 201. The analysis unit 30 produces a graph showing the temperature difference alteration, like FIG. 3, based on, for example, the operation data containing the temperature difference data 201 and analyzes the predicted alteration of the future temperature difference from the graph showing the temperature difference alteration. Specifically, the analysis unit 30 analyzes the predicted alteration of the future temperature difference from the slopes of graphs showing the temperature difference alteration that is obtained from the temperature difference data 201. In addition, the analysis unit 30 sets a case where the tower top portion temperature is below the salting-out temperature as a state in which the operation of the distillation tower 103 is hindered, determines whether or not the tower top portion temperature is below the salting-out temperature in the predicted alteration obtained by analysis, and produces the analysis data 300 containing the determination result.

The analysis unit 30 stores the produced analysis data 300 in the storage unit (not shown) through the network 50.

A case where the state of the distillation tower 103 is analyzed using the operation data containing the chlorine rate difference data 202 in the analysis data production step S3 will be described.

First, the analysis unit 30 acquires operation data containing the chlorine rate difference data 202 produced by the operation data production step S2 that is stored in the storage unit.

Next, the analysis unit 30 analyzes the predicted alteration of a future temperature difference from the chlorine rate difference alteration that is obtained from the chlorine rate difference data 202 based on the operation data containing the chlorine rate difference data 202. The analysis unit 30 produces a graph showing the chlorine rate difference alteration, like FIG. 4, based on, for example, the operation data containing the chlorine rate difference data 202 and analyzes the predicted alteration of the future temperature difference from the graph showing the chlorine rate difference alteration. Specifically, the analysis unit 30 analyzes the predicted alteration of the future chlorine rate difference from the slopes of graphs showing the chlorine rate difference alteration that is obtained from the chlorine rate difference data 202. In addition, the analysis unit 30 sets a case where the chlorine rate difference between the chlorine feed rate and the chlorine discharge rate becomes a certain value or more as a state in which the operation of the distillation tower 103 is hindered, determines whether or not the chlorine rate difference between the chlorine feed rate and the chlorine discharge rate becomes the certain value or more in the predicted alteration obtained by analysis, and produces the analysis data 300 containing the determination result.

The analysis unit 30 stores the produced analysis data 300 in the storage unit (not shown) through the network 50.

[Distillation Tower Management Method]

Figure 6:
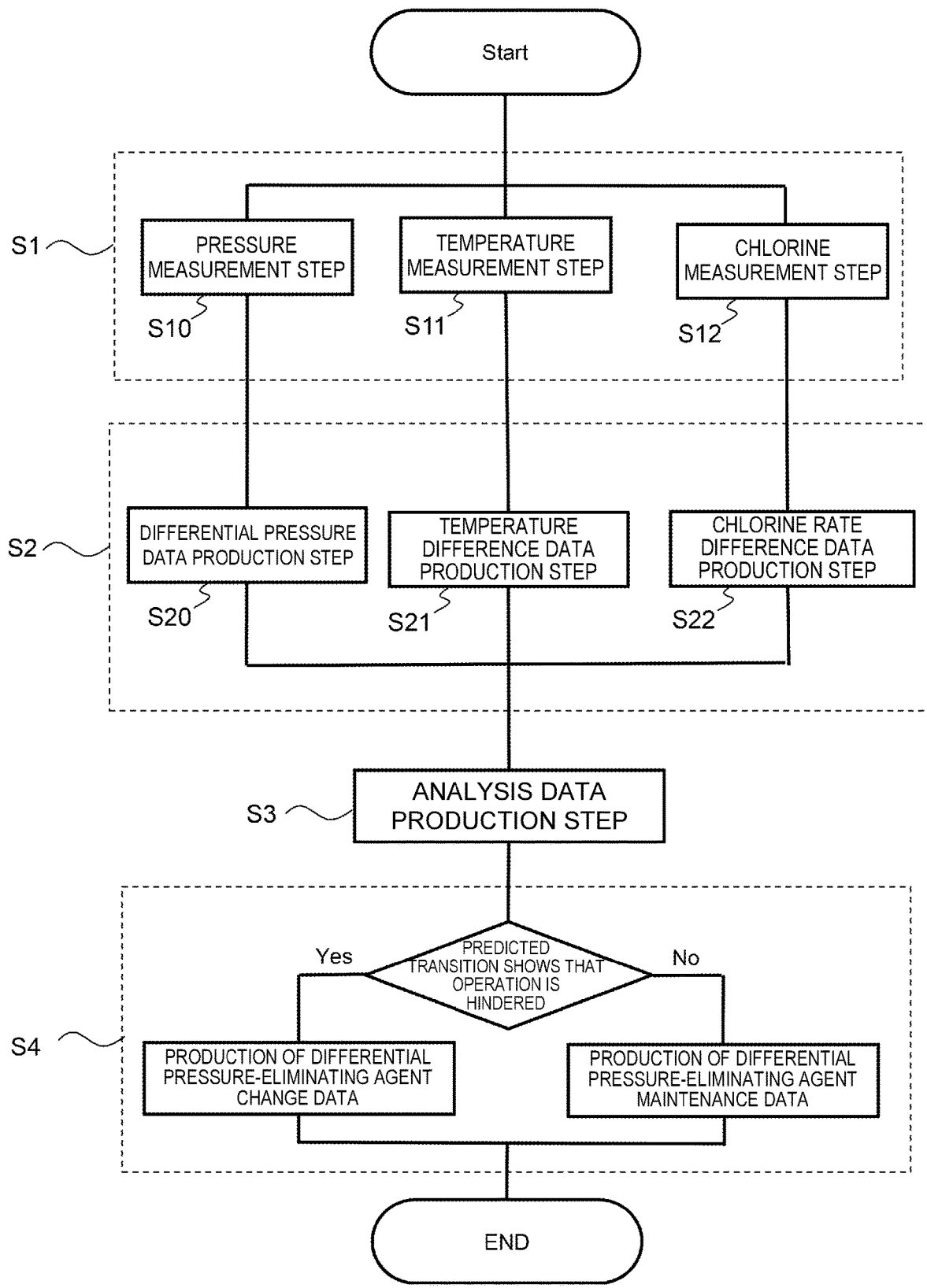
FIG. 6 is a flowchart showing a distillation tower management method according to the embodiment of the present invention.

A distillation tower management method according to the present embodiment includes a measurement step S1, an operation data production step S2, an analysis data production step S3 and a control data production step S4 as shown in FIG. 6. Hereinafter, the distillation tower management method according to the present embodiment will be described with reference to FIG. 1 and FIG. 6.

The measurement step S1, the operation data production step S2 and the analysis data production step S3 are the same as those in the above-described distillation tower state analysis method and thus will not be described again.

<Control Data Production Step>

In the control data production step S4, the control data 400 regarding the differential pressure-eliminating agent that is added to the distillation tower 103 is produced with the control unit 40 based on the analysis data 300.

Specifically, first, the control unit 40 acquires the analysis data 300 produced by the analysis data production step S3 that is stored in the storage unit.

Next, the control unit 40 determines whether or not the state in which the operation of the distillation tower 103 is hindered is predicted to be reached in the analysis data 300. In addition, in a case where the operation of the distillation tower 103 is predicted not to be hindered in the analysis data 300, the control unit 40 produces the control data 400 that maintains the kind of the differential pressure-eliminating agent that is added to the distillation tower 103 and the amount of the differential pressure-eliminating agent added. In addition, in a case where the operation of the distillation tower 103 is predicted to be hindered in the analysis data 300, the control unit 40 produces the control data 400 that changes the kind of the differential pressure-eliminating agent that is added to the distillation tower 103 and/or increases the amount of the differential pressure-eliminating agent added.

Next, the control unit 40 sends the control data 400 to the differential pressure-eliminating agent tank 120 and adds the differential pressure-eliminating agent to the distillation tower 103 based on the control data 400. The differential pressure-eliminating agent is preferably at least one of a salt remover and a salt dispersant.

INDUSTRIAL APPLICABILITY

According to the distillation tower management system, the distillation tower state analysis method and the distillation tower management method of the present invention, since it is possible to predict abnormality in distillation towers before the abnormality becomes apparent and to take preventive actions, it is possible to improve the facility use efficiency and to extend the service lives of facilities.

REFERENCE SIGNS LIST

1: Distillation tower management system
10: Measurement unit
11: Pressure measurement unit
12: Temperature measurement unit
13: Chlorine measurement unit
20: Operation data unit
30: Analysis unit
40: Control unit
50: Communication network
100: Distillation tower facility
102, 104, 108, 109: Line
103: Distillation tower
105: Air cooling-type cooler
106: Heat exchanger
107: Naphtha receiver
110: Water drainage unit
111, 111A, 111B, 111C: Heat exchanger
112a, 112b: Side stripper
113, 114, 115a, 116a: Line
120: Differential pressure-eliminating agent tank
121a, 121b, 121c: Differential pressure-eliminating agent injection line

The invention claimed is:

1. A distillation tower management system comprising:
a distillation tower;
a chlorine measurement unit that measures a feed rate of chlorine fed to the distillation tower and a discharge rate of chlorine discharged from the distillation tower;
an operation data unit that produces operation data containing measurement data measured with the measurement unit;
an analysis unit that analyzes a state of the distillation tower from the operation data and produces analysis data regarding the state of the distillation tower;
a control unit that produces, based on the analysis data, control data regarding a differential pressure-eliminating agent that is added to the distillation tower;
a differential pressure-eliminating agent tank that connect the distillation tower and the control unit,
wherein the analysis unit produces the analysis data comprising:
the operation data unit produces operation data containing chlorine rate difference data regarding a difference in chlorine rate between the chlorine feed rate and the chlorine discharge rate measured with the chlorine measurement unit,
the analysis unit graphs a chlorine difference alteration that is obtained from the chlorine rate difference data with a horizontal axis representing a number of operation days and a vertical axis representing amounts of chlorine,
the analysis unit analyzes a predicted alteration of future chlorine rate difference from a slope of a graph showing the chlorine rate difference alteration that is obtained from the chlorine rate difference data, and
the analysis unit generates the analysis data by determining whether determining whether the predicted alteration of the future chlorine rate difference reaches a first hindrance threshold, wherein reaching the first hindrance threshold indicate that operation of the distillation tower is hindered, wherein alteration of current chlorine rate difference does not reach the first hindrance threshold, wherein the control unit determines whether the operation of the distillation tower is predicted to be hindered according to the analysis data, wherein in response to determining that the operation of the distillation tower is predicted to be hindered, the control unit produces and transmits control data to the differential pressure-eliminating agent tank to perform at least one of the following operations:

changing the kind of the differential pressure-eliminating agent that is added to the distillation tower; and increasing the amount of the differential pressure-eliminating agent that is added to the distillation tower, such that hindrance of the operation of the distillation tower and corrosion of the distillation tower due to the hindrance of the operation of the distillation tower are prevented.

2. The distillation tower management system according to claim 1, the system further comprises:

a pressure measurement unit that measures pressures at a plurality of different sites in a height direction of a distillation tower, wherein the analysis unit produces the analysis data comprising:

the operation data unit produces operation data containing differential pressure data regarding a differential pressure between pressures at a plurality of sites measured with the pressure measurement unit, the analysis unit graphs a differential pressure alteration that is obtained from the differential pressure data with a horizontal axis representing a number of operation days and a vertical axis representing differential pressures, the analysis unit analyzes a predicted alteration of future differential pressure from a slope of a graph showing the differential pressure alteration that is obtained from the differential pressure data, and the analysis unit generates the analysis data by determining whether the predicted alteration of the future differential pressure reaches a second hindrance threshold, wherein reaching the second hindrance threshold indicates that operation of the distillation tower is hindered.

3. The distillation tower management system according to claim 1, wherein the differential pressure-eliminating agent is at least one of a salt remover and a salt dispersant.

4. The distillation tower management system according to claim 1, the system further comprises:

a temperature measurement unit that measures a tower top portion temperature of the distillation tower, wherein the analysis unit produces the analysis data comprising:

the operation data unit produces operation data containing temperature difference data regarding a temperature difference between the tower top portion temperature measured with the temperature measurement unit and a salting-out temperature obtained by calculation, the analysis unit graphs a temperature difference alteration between the tower top portion temperature and the salting-out temperature with a horizontal axis representing a number of operation days and a vertical axis representing temperatures, the analysis unit analyzes a predicted alteration of future temperature difference from a slope of a graph showing the temperature difference alteration that is obtained from the temperature difference data, and the analysis unit generates the analysis data by determining whether the predicted alteration of the future temperature difference reaches a third hindrance threshold, wherein reaching the third hindrance threshold indicates that operation of the distillation tower is hindered.

* * * * *